(12) United States Patent
Katsaros

(10) Patent No.: US 9,546,691 B2
(45) Date of Patent: Jan. 17, 2017

(54) METHOD FOR SETTING THE PRELOAD IN A BEARING ASSEMBLY

(71) Applicant: Padelis Katsaros, Schweinfurt (DE)

(72) Inventor: Padelis Katsaros, Schweinfurt (DE)

(73) Assignee: AKTIEBOLAGET SKF, Gothenburg (SE)

(*) Notice: Subject to any disclaimer, the term of this patent is extended or adjusted under 35 U.S.C. 154(b) by 169 days.

(21) Appl. No.: 14/268,355

(22) Filed: May 2, 2014

(65) Prior Publication Data

US 2015/0052758 A1  Feb. 26, 2015

(30) Foreign Application Priority Data

May 8, 2013  (DE) .................. 10 2013 208 480

(51) Int. Cl.

| F16C 25/06 | (2006.01) |
|---|---|
| F16C 43/06 | (2006.01) |
| F16C 19/18 | (2006.01) |
| F16C 19/38 | (2006.01) |
| F16C 41/00 | (2006.01) |

(52) U.S. Cl.
CPC .......... *F16C 43/065* (2013.01); *F16C 19/181* (2013.01); *F16C 19/386* (2013.01); *F16C 25/06* (2013.01); *F16C 41/008* (2013.01); *F16C 2229/00* (2013.01); *Y10T 29/497* (2015.01)

(58) Field of Classification Search
CPC ..... F16C 43/065; F16C 19/386; F16C 19/181; F16C 25/06; F16C 41/008; F16C 2229/00; Y10T 29/497

See application file for complete search history.

(56) References Cited

U.S. PATENT DOCUMENTS

| 5,263,372 A * | 11/1993 | Matsuzaki ............ F16C 19/522 73/593 |
| 6,873,264 B2 * | 3/2005 | Ikeda .................. B41F 33/0081 250/231.16 |

* cited by examiner

*Primary Examiner* — Richard Chang
(74) *Attorney, Agent, or Firm* — Bryan Peckjian; SKF USA Inc. Patent Dept.

(57) ABSTRACT

A method for adjusting an axial preload in a bearing assembly that has two rolling-element bearings that are axially pressable against each other, each of the two rolling-element bearings including at least one bearing outer ring and at least one bearing inner ring and at least one row of rolling elements disposed between the at least one bearing outer ring and at least one bearing inner ring. The method includes a) driving the bearing assembly by rotating one of the bearing outer ring and the bearing inner ring while holding other bearing ring fixed and measuring the rotational speed of the circulation of the rolling elements about the bearing assembly axis or of a bearing cage about the stationary bearing ring, and b) changing the axial preload in the bearing assembly until a desired rotational speed has been obtained.

8 Claims, 3 Drawing Sheets

METHOD FOR SETTING THE PRELOAD IN A BEARING ASSEMBLY

CROSS-REFERENCE

This application claims priority to German patent application no. 10 2013 208 480.3 filed on May 8, 2013, the contents of which are fully incorporated herein by reference.

BACKGROUND

The present disclosure is directed to a method for setting the axial preload in a bearing assembly, which bearing assembly includes two rolling-element bearings that are pressable against each other in an axial direction. Each rolling-element bearing includes at least one bearing outer ring and at least one bearing inner ring. At least one row of rolling elements is disposed between the inner and outer ring, and the rolling elements are preferably retained by a cage.

The setting (adjusting) of the preload—in particular in a tapered roller bearing or angular contact ball bearing—is a relatively time-consuming and/or complex process and sometimes also an inaccurate process.

It is conventionally known to set the correct bearing preload by measuring the friction torque of the bearing. An increase of the friction torque corresponds to (means) an increase of the bearing preload, and the preload can thus be determined from the measured friction torque. Under this conventional procedure, the preload is gradually increased by tightening a clamping nut. Upon reaching a predetermined value of the friction torque, the clamping nut is then secured so as to prevent rotation.

Another known method for setting a preload is to measure the components in the preload circuit/closed-path and then generate the required preload path using a shim; the desired preload is then fixed or maintained by tightening a nut against a stop.

SUMMARY

A feature of the disclosure is to provide a method that makes it possible to set the preload in a bearing assembly of the above-described type in a simpler manner. This may be accomplished by a method that includes a) driving the bearing assembly by rotating the bearing outer ring with the bearing inner ring held fixed, or rotating the bearing inner ring with the bearing outer ring held fixed, with no or only a small amount of axial preload in the bearing assembly, and measuring the rotational speed (angular speed) of the circulation of the rolling elements or of the rotational speed (angular speed) of the cage about the stationary bearing ring. The method also includes b) increasing the axial preload in the bearing assembly while further measuring the rotational speed (angular speed) of the circulation of the rolling elements or of the rotational speed of the cage about the stationary bearing ring and c) stopping the increasing of the axial preload in the bearing assembly as soon as a defined change of the rotational speed (angular speed) of the circulation of the rolling elements or of the rotational speed (angular speed) of the cage about the stationary bearing ring occurs.

The measuring of the change of the rotational speed (angular speed) of the circulation of the rolling elements or of the rotational speed of the cage about the stationary bearing ring is effected here in a particularly advantageous manner using a strobe light or stroboscope. Before step a) above, at least one marking for this purpose can be applied to at least one rolling element or to the cage. This marking may, for example, comprise a spot on a rolling element or on the cage. The spot here is preferably made with reflective paint. For good visibility, the marking is preferably applied to an end side of the rolling element or of the cage. The stopping of the increasing of the axial preload according to step c) above preferably occurs as soon as the marking illuminated by the stroboscope has a predetermined rotational speed of circulation, that is, movement about the axis of rotation of the bearing.

In step a) above, the bearing inner ring is preferably held stationary while the bearing outer ring is driven, or the bearing outer ring may be held stationary while the bearing inner ring is driven. Furthermore, the two rolling-element bearings, or at least one thereof, are preferably tapered roller bearings or angular contact ball bearings.

The present concept of setting (adjusting) the preload is based on determining and setting (adjusting) the preload using the rotational speed or angular speed of the roller set or ball set. Here the rotational speed or angular speed of the rollers or of the cage in the preload-free state (or substantially preload-free state) is compared to the rotational speed or angular speed of the rollers or of the cage in the preloaded state.

The rolling elements (rollers or balls) are deformed, i.e. radially compressed, with increasing preload. Holding other operation conditions constant, decreasing the radii of the roller elements changes the circulation speeds of the rollers or of the cage. This change can be readily appreciated by using a stroboscope. The change of the circulation speed made visible by the stroboscope is a measure of the degree of the preload in the bearing assembly.

In order to use this stroboscope effect with a bearing unit, the cage and/or a roller of the roller set are marked with a reflective paint. When the inner or outer ring is driven and a stroboscope is directed on the marked bearing components, the rotational speed or angular speed of the bearing component (roller or cage) can be determined in a known manner.

First the bearing unit, under no preload or under a minimal preload, is rotated at a certain rotational speed, and the stroboscope is adjusted so that the marking "stands still." Then the preload is increased by using a (clamping) nut so that the marking, illuminated by the stroboscope, begins to move in the circumferential direction, i.e. to rotate (circulate) about the rotational axis of the bearing. This movement or rotation is proportional to the deformation of the rollers or balls in Hertzian contact and can be associated or correlated with the size of the axial preload. A "fast movement" of the marking indicates a correspondingly strong deformation of the rolling elements and thus a high preload. A lesser deformation makes the marking move slower, and under no preload (or under the minimal preload used to begin the measurement process) the movement of the marking stops.

A plurality of markings can also be uniformly distributed around the circumference (on the cage or on the rollers) to facilitate the "reading" of the migrating (circulating) movement with the stroboscope.

Using the proposed method the slip in the bearing can also be determined in a relatively simple manner by comparing the theoretical (calculated) angular velocity of the roller set or ball set to the actual (stroboscopically determined) angular speed.

The setting (adjusting) of the preload in the bearing assembly can thus be carried out with relatively little effort.

The influence of the coefficient of friction on the setting of the preload is theoretically eliminated (excluded).

The setting or measuring of the preload can thus be carried out in a simple and relatively precise manner by using a stroboscope.

The relationship between the rotational speed of the migrating (circulating) movement explained above and the preload under which this migrating (circulating) movement occurs can be determined in advance either experimentally or using a simulation calculation.

For this purpose the bearing assembly—in the case of the experimental determination—is loaded with a defined axial load, and the corresponding rotational speed of the migrating movement is recorded (sensed) and plotted. A characteristic curve thus results for different axial loads which reflects the rotational speed of the migrating movement over the preload. This characteristic curve is then used as the basis for the later setting (adjusting) of the preload of the bearing assembly using the described method.

BRIEF DESCRIPTION OF THE DRAWINGS

An exemplary embodiment of the invention is illustrated in the drawings, wherein.

DETAILED DESCRIPTION

Figure 1:
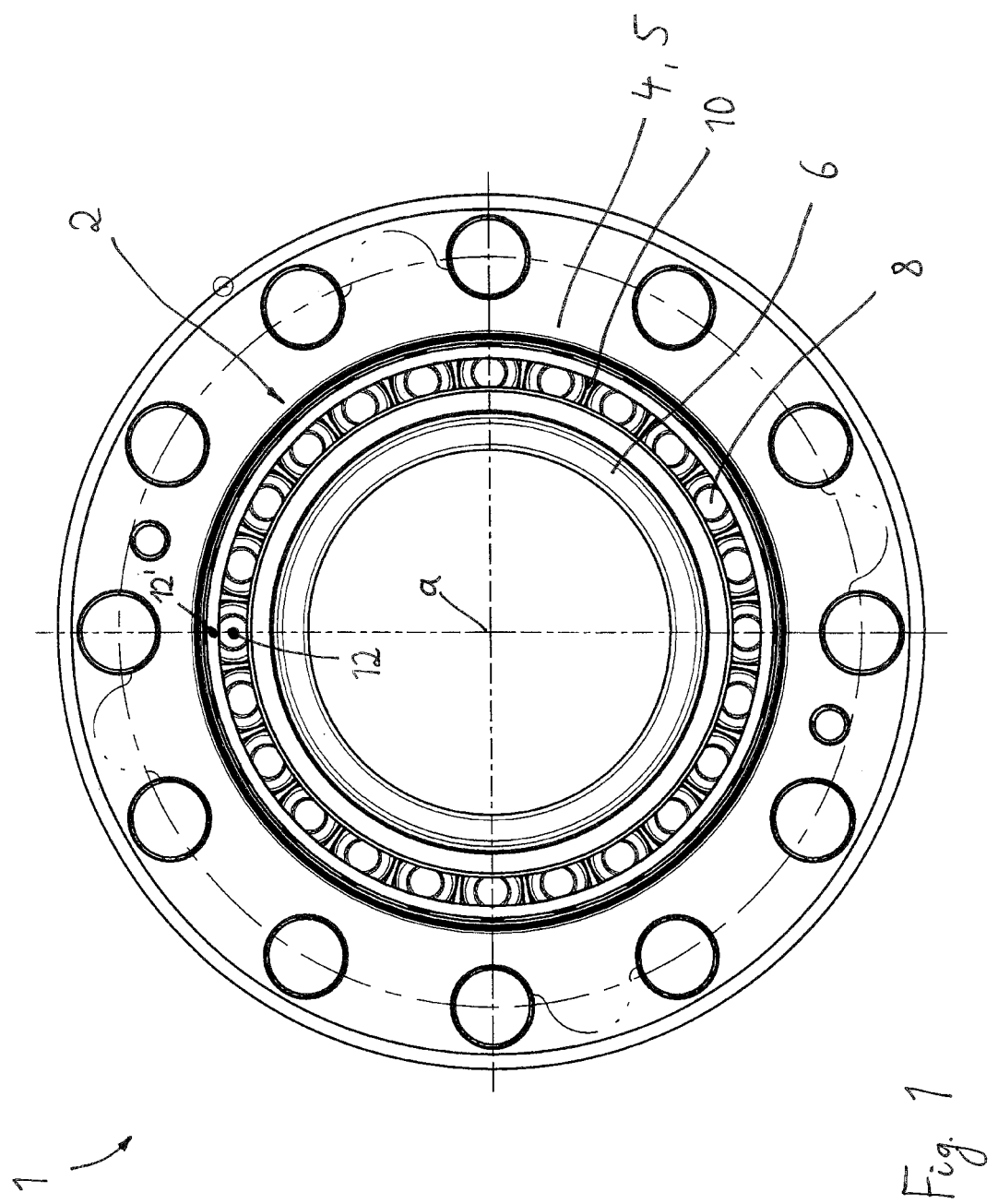
FIG. 1 is a front elevational view of a bearing assembly, viewed in the direction of the axis of rotation, that includes two tapered roller bearings that are pressable against each other.
Figure 2:
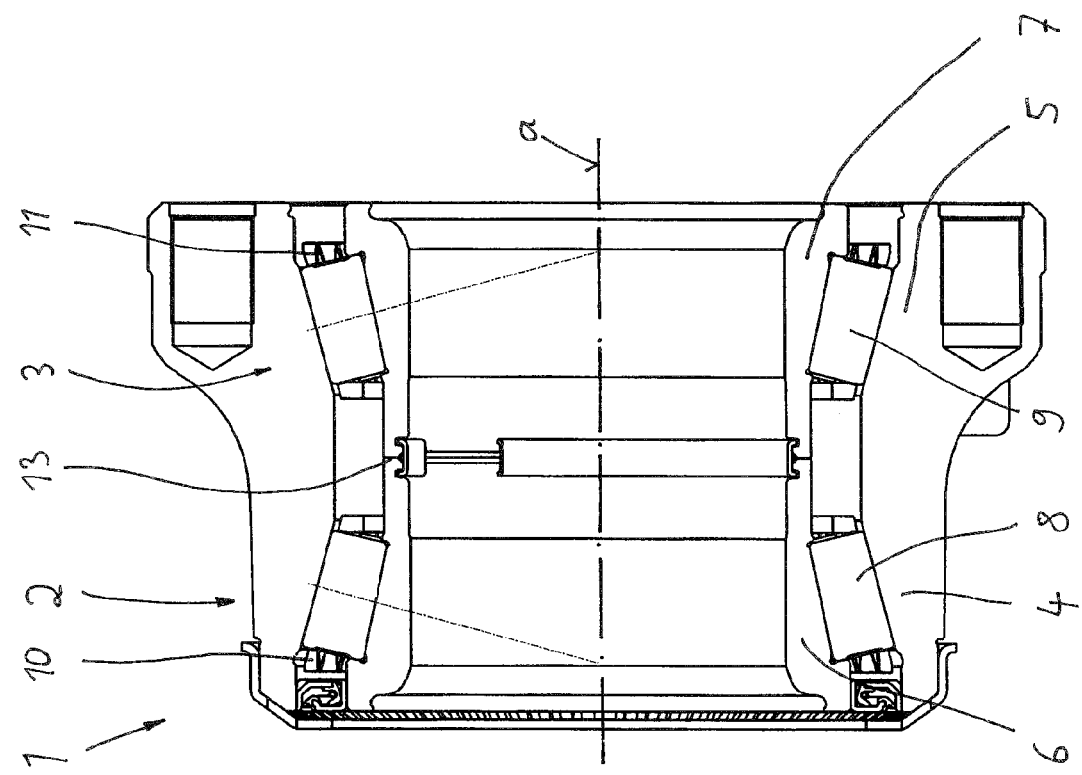
FIG. 2 is a radial sectional view of the bearing assembly of FIG. 1.

A bearing assembly 1 is illustrated in the FIGS. 1 and 2 and includes two rolling-element bearings 2 and 3, in this embodiment, two tapered roller bearings in an O-arrangement. The bearings 2 and 3 comprise bearing outer rings 4 and 5 and bearing inner rings 6 and 7. In this embodiment, the two bearing outer rings 4 and 5 are unitary or one-piece rings.

Rolling elements 8, 9, in this embodiment tapered rollers, are disposed in a known manner between the bearing outer rings 4, 5 and the bearing inner rings 6, 7. The tapered rollers 8, 9 are each guided by a cage 10, 11. The bearing rings 4, 5, 6, 7 of the bearing assembly 1 rotate about the axis of rotation a.

This construction (structure) per se is known as are conventional methods of setting a preload of such a bearing assembly. In order to set and maintain the preload a (clamping) nut (not shown) disposed concentrically with the axis of rotation a is tightened so that the two tapered roller bearings 2, 3 are pushed towards each other axially. This produces an axial (and radial) preload in the bearing assembly.

Figure 3:
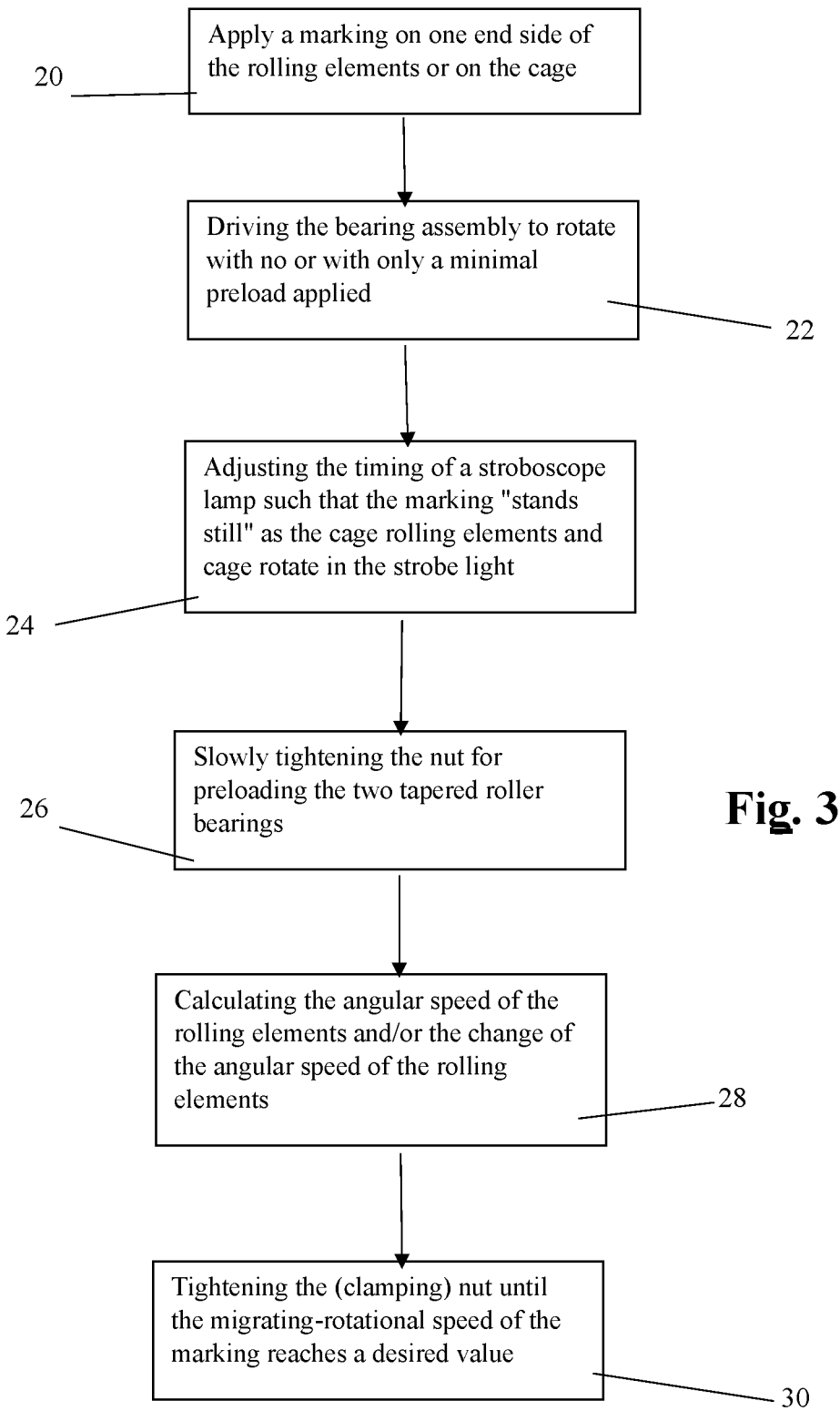
FIG. 3 is a flowchart illustrating a preferred method of setting the preload in a bearing.

In order to be able to set (adjust) the preload in a simple manner, the following steps, as illustrated in FIG. 3, are performed: A first step 20 is preferably to apply a marking 12 (and/or 12') on one end side of the rolling elements 8 (marking 12) or on the cage 10 (marking 12'), with respect to one of the bearings 2, 3. The marking 12 in this case is a spot made from reflective paint. These two alternative marking locations are both illustrated in FIG. 1. The marking 12 is a spot which has been applied to one of the rolling elements 8; alternatively or in addition the cage 10 can be provided with the marking 12'.

The method preferably includes the step 22 of driving the bearing assembly to rotate with no or with only a minimal preload applied. In this embodiment, the bearing outer ring 4, 5 is driven while the bearing inner rings 6, 7 are stationary. The method may include the step 24 of adjusting the timing of a stroboscope lamp (not shown) such that the marking 12 "stands still" as the cage rolling elements 8 and cage 10 rotate in the strobe light. A plurality of rolling elements can also be provided with a marking 12, so that the "standing still" point can be produced even at a lower rotational speed.

The method preferably includes the step 26 of slowly tightening the nut (not shown) for preloading the two tapered roller bearings 2, 3. A gap 13 is provided between the two inner rings 6, 7, so that the setting (adjusting) of a preload is possible. The result is that the rolling elements 8, 9 are subjected to a force radially and axially and are slightly compressed.

This compression changes the actual effective rolling radius in the bearings 2, 3, and, consequently, with an otherwise constant driving speed of the outer ring, a change of the rotational speed or angular speed of the rolling elements 8, 9 and thus also of the cage 10, 11 about the bearing axis of rotation a takes place. The method may include a step 28 of calculating the angular speed of the rolling elements 8, 9 and/or the change of the angular speed of the rolling elements 8, 9.

The frequency of the stroboscope lamp is kept constant, and thus tightening the nut causes the marking 12 or 12' to "migrate" under the stroboscope in the circumferential direction. The angular speed of the marking 12 or 12' is a direct and proportional measure for the preload in the bearing assembly 1.

The method preferable includes the step 30 of tightening the (clamping) nut until the migrating-rotational speed of the marking 12 or 12' reaches a desired value. This desired value can be taken from the above-described characteristic curve previously determined for the bearing assembly. This produces the corresponding preload in the bearing, and preload can thus be set relatively precisely to a desired value without complex or time-consuming measures.

Various modifications to the foregoing method are also possible. For example, instead of starting with little or no preload on the bearing assembly 1, the method could be performed by applying a greater than needed preload to the bearing assembly and decreasing the preload until a desired circulation speed of the marking 12 or 12' is achieved. Separately or in addition, instead of setting the frequency of the stroboscope so that the marking 12, 12' moves at a certain speed under the desired preload, the frequency of the stroboscope could be set so that the marking 12, 12' becomes stationary when the desired preload is obtained.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved methods for setting the preload of a bearing assembly.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing assembly
2 Rolling-element bearing
3 Rolling-element bearing
4 Bearing outer ring
5 Bearing outer ring
6 Bearing inner ring
7 Bearing inner ring
8 Rolling element
9 Rolling element
10 Cage
11 Cage
12 Marking
12' Marking
13 Gap
a Axis of rotation

What is claimed is:

1. A method for adjusting an axial preload in a bearing assembly having an axis of rotation and comprising two rolling-element bearings configured to be axially pressable against each other, each of the two rolling-element bearings including a first ring, a second ring and a row of rolling elements disposed between the first ring and the second ring, the method comprising:
providing a marking on one of a rolling element in the row of rolling elements and a cage guiding the row of rolling elements;
rotating the first ring while holding the second ring fixed, with no or only a small amount of axial preload in the bearing assembly;
illuminating the bearing assembly with a stroboscope lamp;
after rotating the first ring, adjusting a frequency of the stroboscope lamp based on an initial angular speed of the marking about the axis of rotation of the bearing assembly;
after adjusting the frequency of the stroboscope lamp, increasing the axial preload in the bearing assembly while continually illuminating the bearing assembly with the stroboscope lamp at the frequency;
calculating a current angular speed of the marking based upon locations of the marking when the bearing assembly is illuminated by the stroboscope lamp such that the current angular speed of the marking is not calculated by using vibrations of the bearing assembly and no vibrations of the bearing assembly are measured;
determining a change of angular speed of the marking by comparing the initial angular speed and the current angular speed;
stopping the increasing of the axial preload in the bearing assembly in response to a the change of angular speed equaling a predetermined change of angular speed of the marking about the axis of rotation which corresponds to a predetermined preload.

2. The method according to claim 1, wherein the marking comprises a spot on the rolling element and/or on the cage.

3. The method according to claim 2 wherein the spot comprises reflective paint.

4. The method according to claim 1, wherein the marking is formed on an end side of the rolling element or an end side of the cage.

5. The method according to claim 1, wherein the stopping of the increasing of the axial preload occurs in response to a determination that the marking illuminated by the stroboscope lamp has a predetermined rotational speed of circulation.

6. The method according to claim 1 wherein the two rolling-element bearings are tapered roller bearings.

7. The method according to claim 1, wherein the two rolling-element bearings are angular contact ball bearings.

8. The method of according to claim 1 including determining bearing slip by comparing a theoretical angular velocity of the circulation of the rolling elements or of the cage to the current angular speed of the marking.

* * * * *